No. 836,030. PATENTED NOV. 13, 1906.
J. R. HALL.
CYLINDER TOOTH FOR THRESHING MACHINES.
APPLICATION FILED FEB. 2, 1906.
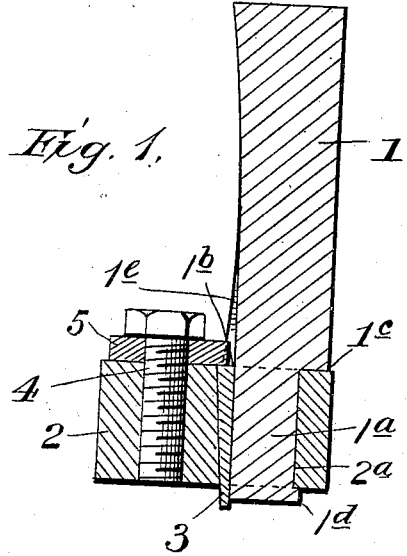
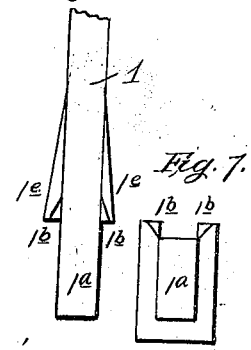
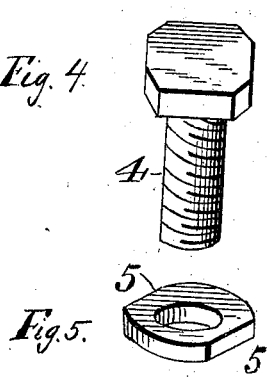
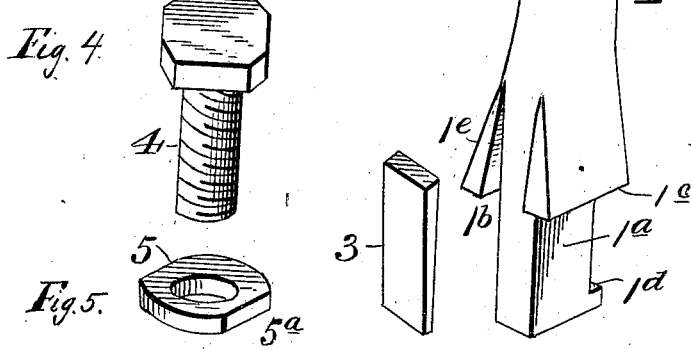
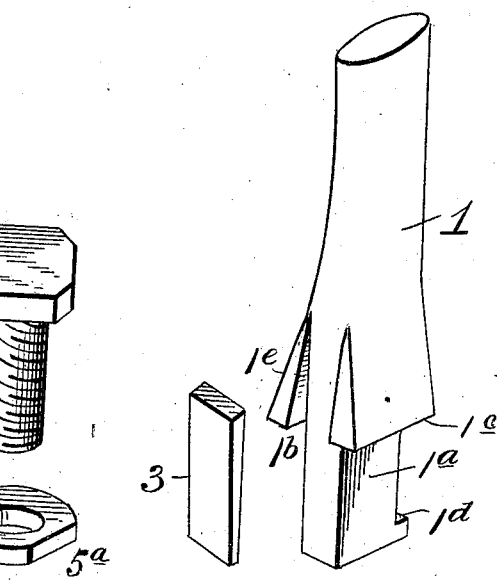
Witnesses:
H. T. McKeever
J. W. Miter
Inventor:
John R. Hall,
By Louis Bagger & Co.
Attorneys

UNITED STATES PATENT OFFICE.

JOHN R. HALL, OF DE MOSS SPRINGS, OREGON, ASSIGNOR OF ONE-HALF TO ROBERT J. GINN, OF MORO, OREGON.

CYLINDER-TOOTH FOR THRESHING-MACHINES.

No. 836,030.　　　Specification of Letters Patent.　　　Patented Nov. 13, 1906.

Application filed February 2, 1906. Serial No. 299,207.

*To all whom it may concern:*

Be it known that I, JOHN R. HALL, a citizen of the United States, residing at De Moss Springs, in the county of Sherman and State of Oregon, have invented certain new and useful Improvements in Cylinder-Teeth for Threshing-Machines, of which the following is a specification.

My invention relates to improvements in means for securing the teeth to the cylinders or "concaves" of threshing-machines. Its object is to accomplish that end in a simple, economic, and effective manner; and it therefore consists of certain structural features, substantially as hereinafter fully disclosed, and particularly pointed out by the claims.

In the accompanying drawings, illustrating the preferred embodiment of my invention, Figure 1 is a sectional elevation thereof. Fig. 2 is a detached perspective view of the tooth, viewing its key-receiving groove or recess. Figs. 3, 4, and 5 are perspective views of the key, bolt, and washer constituting the principal members of the fastening. Fig. 6 is a front elevation, and Fig. 7 is a bottom view.

In carrying out my invention I provide the tooth 1, as also each tooth of the threshing-cylinder, with a shank $1^a$, preferably rectangular in cross-section, which shank is so formed as to leave forward and lateral shoulders $1^b$ $1^c$ at its upper end and is equipped at its extreme lower forward edge with a lug or projection $1^d$, adapted to engage or bear upon the under side of the cylinder cross-bar 2. Said shank $1^a$ is inserted or let into an aperture or socket $2^a$, produced in the cylinder cross-bar 2, which socket, however, is of a greater area in a direction from the forward to the rear edge than said shank, thereby leaving a slot extension in rear of the latter for the reception of a wedge or key 3 to provide, in connection with the lug or projection $1^d$ of the tooth-shank, for the effective retention in place of the tooth. Said tooth has formed in its rear surface a recess or groove $1^e$, extending in a direction parallel with its axis and having its bottom surface flush with the corresponding surface of the tooth-shank and the outer surface of the tooth-body. This groove or recess is designed to initially receive the key or wedge 3 as the latter is inserted into the slot extension in rear of the tooth, the lateral walls of said recess or groove therefore extending beyond the plane of the insertion and withdrawal of said key or wedge to aid in guarding against its displacement.

A suitably-headed bolt 4 is screwed or tapped into the cylinder bar or slat 2 contiguous to the tooth 1, and upon said bolt is fitted a washer 5 with a segment or portion of its surface removed, as at $5^a$, and which washer is adapted, when turned so as to take its mutilated portion out of the plane of the key or wedge, to rest above and to be clamped down upon the latter by suitably turning or manipulating said bolt, resulting in effectively securing said key or wedge in place against working loose or possible displacement, as is apparent. The tooth may be readily removed or displaced when required, the bolt 4 being loosened and the washer 5 adjusted, so as to present its mutilation $5^a$ toward the tooth preliminary thereto, permitting the key or wedge to be readily dislodged or withdrawn, when the tooth may be moved rearward to disengage the lug or projection $1^d$ of its shank from the cylinder cross-bar 2 and be finally removed. This arrangement, it is also apparent, permits of the insertion and securing of the tooth from the outside of the threshing-cylinder as distinguished from placing it in position from within the latter.

I claim—

1. A threshing-cylinder tooth provided at its inner end with a projection or lug and with a groove or recess in its rear surface, a key or wedge engaging said tooth, and a washer-equipped bolt, the washer thereof being adapted to bear upon said key or wedge by the action of said bolt.

2. A threshing-cylinder tooth provided at its inner end with a projection or lug, and a forward shoulder and lateral shoulders at the upper end of its shank, said tooth having a recess or groove in its rear surface, a bolt arranged contiguous to said tooth, and a mutilated washer arranged upon said bolt and adapted to engage said key or wedge.

In testimony whereof I have signed my name to this specification in the presence of two subscribing witnesses.

JOHN R. HALL.

Witnesses:
J. L. VAN KIRK,
S. B. CUMMINS.